United States Patent [19]

Suzuki et al.

[11] Patent Number: 5,629,795
[45] Date of Patent: May 13, 1997

[54] OPTICAL AMPLIFYING-REPEATING TRANSMISSION SYSTEM

[75] Inventors: Masatoshi Suzuki, Kawajima-Saitama; Itsuro Morita, Tokyo; Shu Yamamoto, Shiki; Noboru Edagawa, Tokyo; Hidenori Taga, Sakado; Shigeyuki Akiba, Tokyo, all of Japan

[73] Assignee: Kokusai Denshin Denwa Kabushiki Kaisha, Tokyo, Japan

[21] Appl. No.: 521,973

[22] Filed: Aug. 31, 1995

[30] Foreign Application Priority Data

Sep. 12, 1994 [JP] Japan .................................. 6-242405
May 30, 1995 [JP] Japan .................................. 7-154141

[51] Int. Cl.⁶ .............................. H01S 3/00; H04B 10/02
[52] U.S. Cl. ......................... 359/337; 359/161; 359/176
[58] Field of Search ................................. 359/174, 161, 359/176, 337, 341

[56] References Cited

U.S. PATENT DOCUMENTS

| | | | |
|---|---|---|---|
| 5,140,452 | 8/1992 | Yamamoto et al. | 359/154 |
| 5,140,656 | 8/1992 | Hasegawa et al. | 385/24 |
| 5,355,240 | 10/1994 | Prigent et al. | 359/161 |
| 5,365,362 | 11/1994 | Gnauck et al. | 359/174 |
| 5,471,333 | 11/1995 | Taga et al. | 359/173 |

*Primary Examiner*—Mark Hellner
*Attorney, Agent, or Firm*—Emmanuel J. Lobato; Burns & Lobato, P.C.

[57] ABSTRACT

An optical amplifying-repeating transmission system is disclosed which is composed of an optical fiber for transmitting a lightwave signal with digital information added to return-to-zero lightwave pulses and a plurality of optical amplifying repeaters inserted in the optical fiber for transmission use. The mean value of wavelengths at which the wavelength dispersion of the optical fiber is zero is smaller than the wavelength of the lightwave signal which is transmitted over the system. The accumulated wavelength dispersion value of the optical fiber tends to increase with the distance of transmission, from a macroscopic viewpoint. The optical fiber for transmission is divided into a plurality of sections. In accordance with the accumulated wavelength dispersion value of the optical fiber in each section except at least the last one, a wavelength dispersion medium, which locally changes the wavelength dispersion in a manner to cancel the accumulated wavelength dispersion in the section at the wavelength of the lightwave signal, is inserted in the section to eliminate the accumulation of the timing jitter.

6 Claims, 17 Drawing Sheets

OPTICAL AMPLIFYING-REPEATING TRANSMISSION SYSTEM

BACKGROUND OF THE INVENTION

The present invention relates to a transmission system using optical fibers and, more particularly, to a long-distance, high-capacity optical communication system using return-to-zero (RZ) lightwave pulses and optical amplifying repeaters.

Buttressed by developments of optical amplifying techniques, fiber optic communication technology has made rapid-paced progress toward ultra-long-distance communication, now allowing implementation of a transpacific communication system without the need of using regenerative repeaters. A transoceanic transmission system at a bit rate or transmission rate of about 5 Gbit/s is now feasible through dispersion management of optical fibers. At increased transmission rate above 10 Gbit/s, however, a transmission system using the non-return-to-zero (NRZ) pulse suffers serious degradation of transmission characteristics by the wavelength dispersion characteristic and nonlinear optical effect of optical fibers, imposing severe limitations on the realization of a high-speed, high-capacity transmission system. In recent years, an optical soliton communication system has been in the limelight as a system which will break the bottleneck in the speedup of transmission by the wavelength dispersion characteristic and the nonlinear optical effect.

The optical soliton communication system is a system that positively utilizes the wavelength dispersion characteristic and nonlinear effect of optical fibers which are major factors to the degradation of characteristics of the conventional transmission systems and that transmits optical short pulses intact by balancing optical pulse width expansion owing to the wavelength dispersion by the optical fibers and pulse width compression based on the nonlinear optical effect. The soliton lightwave pulse, which stably propagates without changing its shape and size, is based on the assumption that it is free from losses by the transmission medium; since ordinary optical fibers produce losses, however, the light intensity becomes attenuated with distance, resulting in the nonlinear optical effect being lessened and becoming unbalanced with the dispersion effect. To realize fiber-optic transmission with apparently no loss while keeping the light intensity at a certain value, it is necessary, therefore, that losses by optical fibers be compensated for by optical amplifiers. In the case of using the optical amplifier as a repeater, it is possible to accomplish soliton communication with practically no waveform variations of lightwave pulses like ideal soliton pulses, by setting the average power between repeaters and the average dispersion of optical fibers to soliton conditions.

In the optical soliton communication, however, optical amplifier noise affects the timing jitter of lightwave pulses at the receiving end and eventually deteriorates the transmission characteristic. That is to say, soliton lightwave pulses with noise superimposed thereon undergo random fluctuations of their light intensity and slightly shift in shape from an ideal soliton lightwave pulse, causing fluctuations in the shift amount of the carrier frequency by the nonlinear optical effect. Since this is repeated for each repeater, the time of arrival of lightwave pulses randomly fluctuates during their propagation in optical fibers each having a limited dispersion value, incurring the timing jitter at the receiving end. This phenomenon is called the Gordon-Haus effect, which is a major limiting factor to the transmission characteristic of the optical soliton communication.

FIG. 18 shows the results of computer simulations carried out on 6000 km transmission of 20 Gbit/s soliton lightwave signal over a conventional optical soliton transmission system with optical amplifying repeaters placed at 30 km intervals. FIG. 18(a) is an eye diagram of the waveform of the lightwave signal obtained after the 6000 km transmission and FIG. 18(b) an eye diagram of the lightwave signal after converted by an optical receiver into an electrical signal and then passed through a low-pass filter. It is seen from FIG. 18(a) that the time of arrival of the lightwave signal largely varies owing to the optical amplifier noise, causing a great timing jitter. The bit error rate can be obtained by determining, through stochastic techniques, if the signal level is "1" or "0," depending on whether it is larger or smaller than a certain threshold value at a proper time in the eye diagram of FIG. 18(b). In this instance, since the timing jitter is large, the bit error rate is about 10−5 even if the most appropriate time of determination and the most appropriate threshold value are set. Thus, the prior art cannot ever accomplish a bit error rate which is required in practice, for example, $10^{-12}$. As described above, even if the optical soliton transmission system is employed, the distance of transmission is limited by the Gordon-Haus effect in an ultrafast optical transmission system, for example, in a 20 Gbit/s class.

SUMMARY OF THE INVENTION

An object of the present invention is to provide an optical amplifying-repeating transmission system which permits stable, long-distance transmission of ultrafast lightwave signals by almost completely cancelling the timing jitter by the Gordon-Haus effect.

To attain the above objective, according to the present invention, in an optical amplifying-repeating transmission system which is formed by an optical fiber for transmitting a lightwave signal with digital information added to return-to-zero lightwave pulses and a plurality of optical amplifying repeaters inserted in the optical fiber for transmission use: the mean value of wavelengths at which the wavelength dispersion of the optical fiber is zero is smaller than the wavelength of the lightwave signal which is transmitted over the system; the accumulated wavelength dispersion value of the optical fiber tends to increase with the distance of transmission, from a macroscopic viewpoint; the optical fiber for transmission is divided into a plurality of sections; and in accordance with the accumulated wavelength dispersion value of the optical fiber in each section except the last one, a wavelength dispersion medium, which locally changes the wavelength dispersion in a manner to cancel the accumulated wavelength dispersion in the section at the wavelength of the lightwave signal, is inserted in the section to eliminate the accumulation of the timing jitter. With this system configuration, it is possible to accomplish ultrafast, long-distance transmission of a return-to-zero digital signal at a transmission rate above 20 Gb/s.

That is to say, the present invention possesses the two features listed below.

1) The return-to-zero lightwave pulse is used as the lightwave signal to be transmitted, and after propagation over a certain distance, a soliton lightwave signal is formed to ensure stable propagation of the pulse signal.
2) A positive wavelength dispersion value of the transmission line accumulated during propagation is cancelled for each predetermined section to avoid the accumulation of timing jitter which is a shortcoming of the soliton transmission.

By combining the following two features with those mentioned above, more marked effects can be achieved.

3) The optical amplifier output is set to a large value so that a stable soliton waveform is formed, overcoming non-soliton waves, from a lightwave signal deformed from a soliton lightwave signal by the equalization of the wavelength dispersion.

4) Optical band limited elements are provided in the transmission line to remove the non-soliton waves.

In the conventional optical soliton transmission, as described above, noise of the optical amplifier is superimposed on the soliton lightwave signal, the shift amount of the carrier frequency of the soliton lightwave signal fluctuates owing to the nonlinear optical effect based on random noise, and this fluctuation of frequency is converted to the fluctuation of the time of arrival of the lightwave pulses due to the wavelength dispersion by the optical fiber, causing the timing jitter. The magnitude of the timing jitter is proportional to the dispersion value of the fiber and rapidly increases with an increase in the distance of transmission since the above-mentioned phenomenon is repeated for each optical amplifier. The inventors of this application have found that even if the frequency of the soliton lightwave signal fluctuates, it is possible to restore the timing jitter for each section of the optical fiber and hence prevent the accumulation of the timing jitter through forced cancellation of the accumulated wavelength dispersion in a predetermined section of the optical fiber by passing the lightwave signal through a dispersion medium which has an inverse dispersion characteristic.

BRIEF DESCRIPTION OF THE DRAWING

The present invention will be described in detail below with reference to the accompanying drawings, in which.

DETAILED DESCRIPTION

Figure 1A:
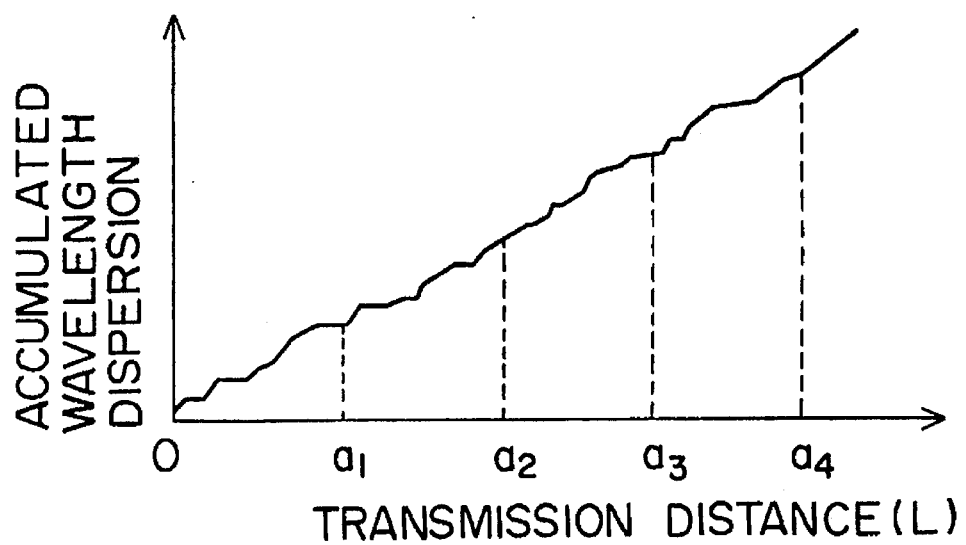
FIG. 1 illustrates a graph (a) showing the relationship of the accumulated wavelength dispersion to the distance of transmission in the conventional optical soliton transmission system and a graph (b) showing the relationship of the accumulated wavelength dispersion to the distance of transmission in the optical amplifying-repeating transmission system according to the present invention.
Figure 1B:
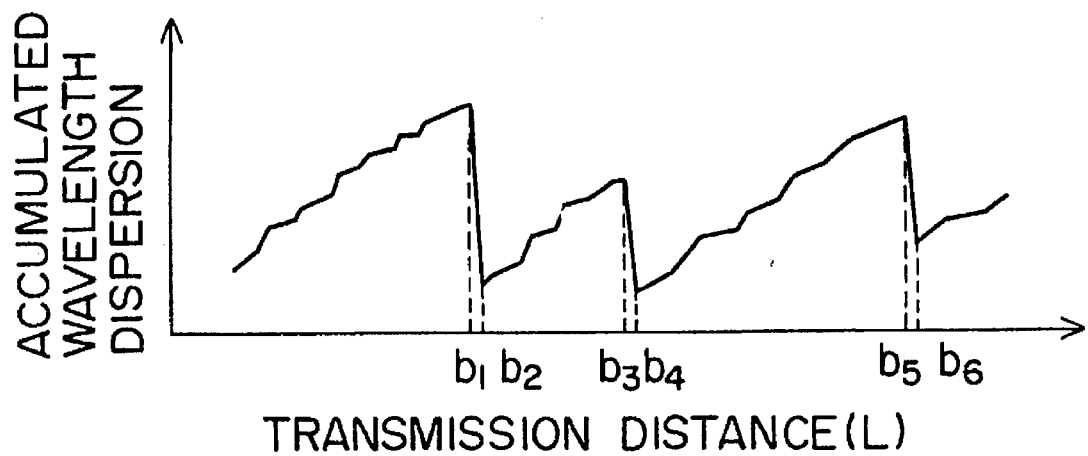
Figure 2:
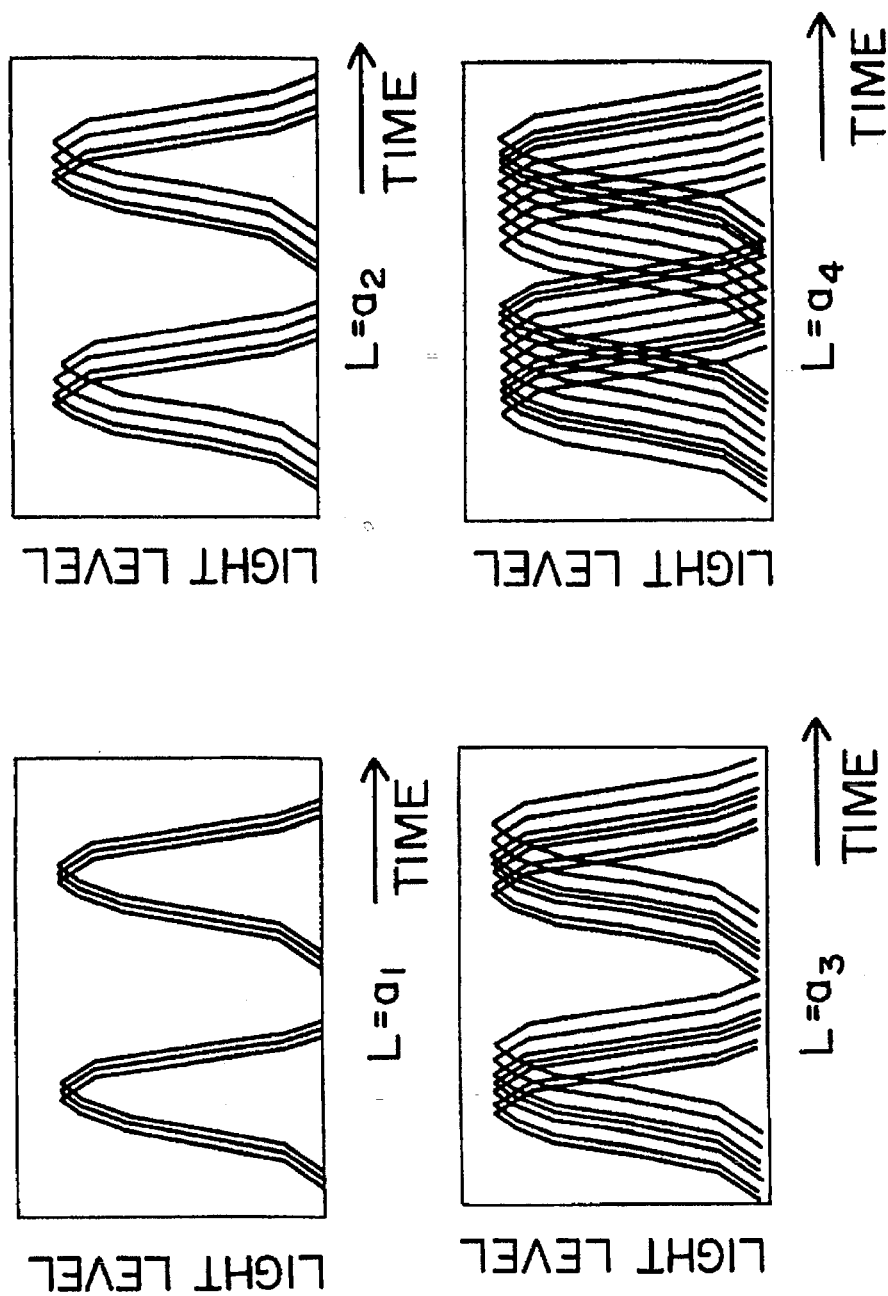
FIG. 2 illustrates graphs showing eye diagrams of lightwave signals at respective distances of transmission in the conventional optical soliton transmission system.
Figure 3:
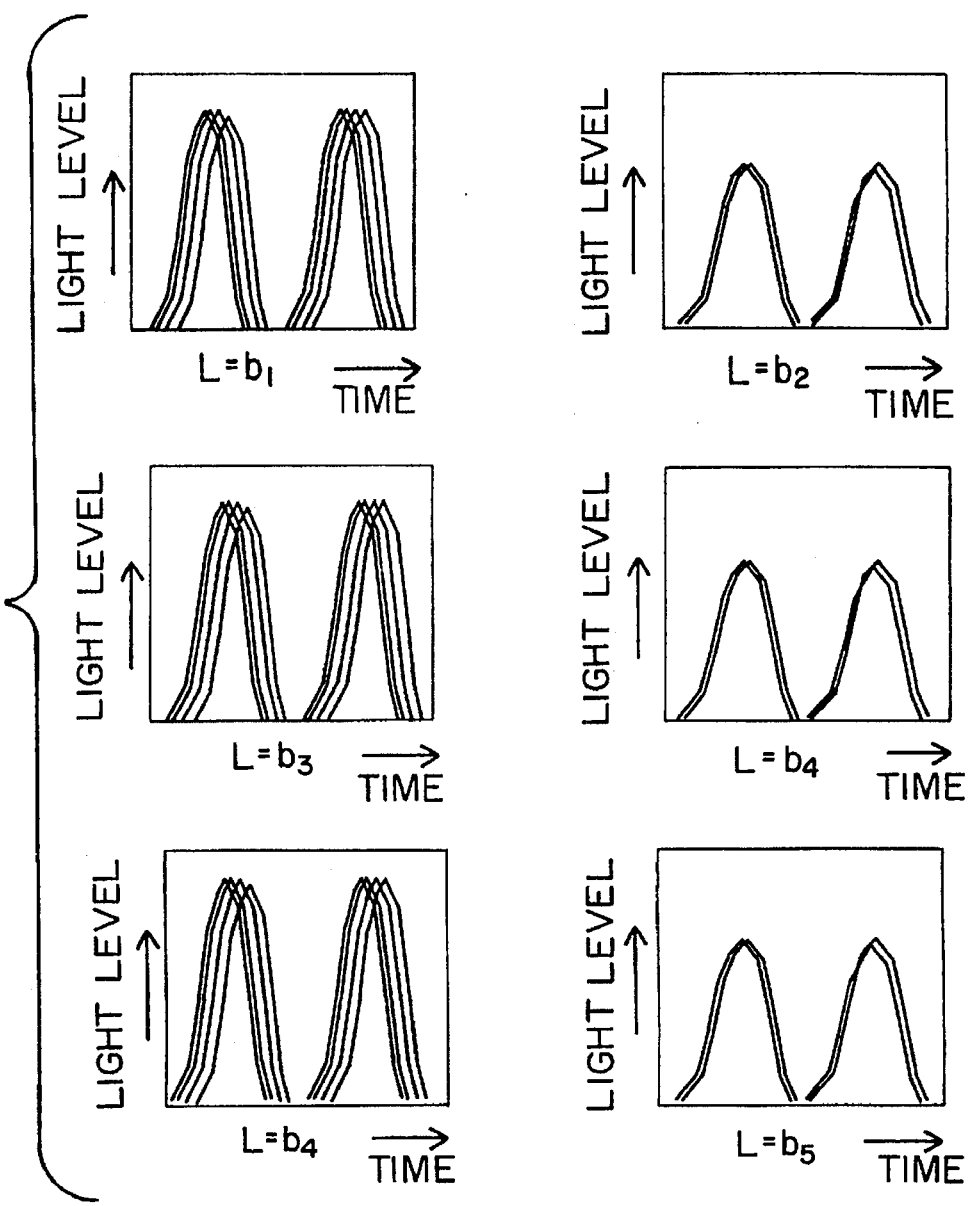
FIG. 3 illustrates graphs showing eye diagrams of lightwave signals at respective distances of transmission in the optical amplifying-repeating transmission system according to the present invention.

FIG. 1(a) is a graph showing the relationship of the accumulated wavelength dispersion to the distance of transmission in the conventional optical soliton transmission system. FIG. 1(b) is a diagram showing the relationship of the accumulated wavelength dispersion to the distance of transmission in the optical amplifying-repeating transmission system of the present invention. In the prior art optical soliton transmission system, the dispersion value of the optical fiber fluctuates microscopically due to its quality variations developed during manufacturing, but from a macroscopical viewpoint, the accumulated wavelength dispersion is set to increase relative to the distance of transmission. Since the optical fiber always has a limited wavelength dispersion value, the timing jitter which results from the frequency fluctuations is accumulated for each section of the optical fiber, and hence rapidly increases with distance, leading to the degradation of the transmission characteristic. To explain this phenomenon, there are schematically shown in FIG. 2 eye diagrams of lightwave signals at respective distances of transmission L (see FIG. 1(a)) in the conventional optical soliton transmission system. It will be seen that as the transmission distance L increases from a1 to a2, a3 and a4, the timing jitter accumulates and rapidly increases with distance. On the other hand, according to the present invention, as shown in FIG. 1(b), accumulated wavelength dispersion by the optical fiber in a predetermined section thereof is forcefully cancelled by passing the signal through a dispersion medium having an inverse dispersion characteristic; hence, even if the frequency fluctuates, it is not apparently converted to timing jitter because no wavelength dispersion takes place. Microscopically, the timing jitter in the soliton transmission is restored or cancelled after the passage of the signal through the dispersion medium, making it possible to prevent the timing jitter from accumulation with distance. In FIG. 3 there are schematically shown eye diagrams of lightwave signals at respective transmission distances L (see FIG. 1(b)) in the optical amplifying-repeating transmission system according to the present invention. Timing jitter slightly caused at a distance b1 is almost restored or cancelled at a distance b2 after the passage through the dispersion medium. It will be understood that since this phenomenon is also repeated between distances b3 and b4 and between b5 and b6, the timing jitter does not get accumulated.

In general, to provide a large negative ispersion locally in the optical soliton transmission system has not been taken into consideration because it is a great deviation from the soliton condition. The present invention offers an entirely novel optical amplifying-repeating transmission system which cancels the timing jitter while maintaining stable soliton transmission and in which the optical transmission line is formed mostly by a transmission line which makes use of the stable transmission characteristic with no waveform degradation, which is an advantage of the optical soliton transmission, and includes a portion which reduces and equalizes the timing jitter which is a disadvantage of the conventional optical soliton transmission.

Incidentally, the present invention is not limited specifically to an optical amplifying-repeating transmission system which utilizes the optical soliton transmission in a narrow sense in which the lightwave pulse waveform and width and the optical repeater output are defined by soliton conditions. In a fiber-optic transmission which has the nonlinear characteristic, if the lightwave pulse waveform is not extremely out of the $sech^2$ type of the soliton lightwave and the optical amplifying repeater output is set to a little large value, then lightwave pulses converge to the soliton lightwave during transmission. Hence, the optical transmission system according to the present invention is an optical soliton transmission system in a wide sense which includes a transmission system which converges RZ lightwave pulses to the soliton lightwave during transmission.

(Embodiment 1)

Figure 4:
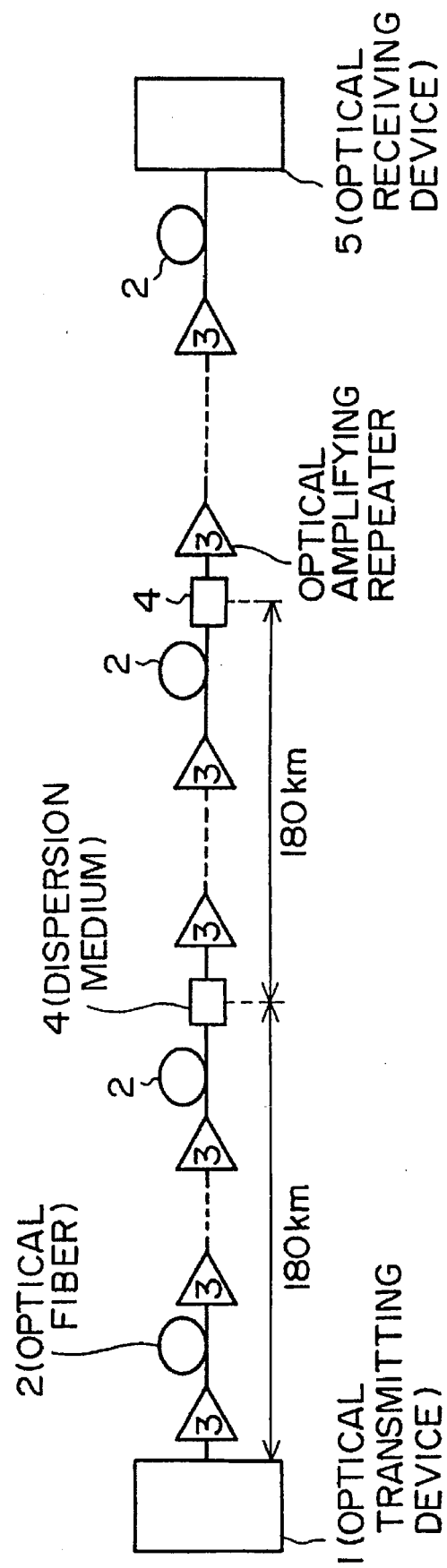
FIG. 4 illustrates a block diagram of an optical amplifying-repeating transmission system of Embodiment 1 of the present invention.

FIG. 4 illustrates a first embodiment of the present invention. Reference numeral 1 denotes a 20 Gbit/s lightwave signal transmitting device, 2 an optical fiber for transmission use, 3 optical amplifying repeaters, 4 dispersion media for compensating for accumulated wavelength dispersion and 5 a lightwave signal receiving device.

In the lightwave signal transmitting device 1, output light of a DFB (Distributed Feedback) laser which continuously oscillates at a wavelength of 1558 nm is converted by an InGaAsP electro-absorption type optical modulator subjected to a sine-wave modulation at 20 GHz, into a 20 GHz repetition-rate RZ optical pulse train, on which a 20 Gbit/s data signal is superimposed by an optical modulator to generate a 20 Gbit/s pseudo-random lightwave signal. The lightwave pulses to be sent are sech2 type return-to-zero lightwave pulses whose full width at half maximum (t) of the time waveform is 7 ps.

The optical fiber 2 is about 9000 km long, the average zero dispersion wavelength is 1555 nm, shorter than the wavelength of the lightwave signal, and the average wavelength dispersion value at the signal wavelength is 0.2 ps/km/nm. To compensate for losses of the optical fibers, there are disposed 300 optical amplifying repeaters 3 at intervals of around 30 km.

The optical amplifying repeaters 3 are each formed by an erbium-doped optical fiber, a WDM (Wavelength Division Multiplexing) coupler, an optical isolator and an optical band-pass filter (full width at half maximum: 6 nm) as an optical band limited element; a continuous oscillation laser light of a 1480 nm wavelength is applied as excitation light to the WDM coupler to back excite the erbium-doped optical fiber.

The average optical power for each section between the optical amplifying repeater 3 of the optical fiber 2 is approximately 1 dBm in terms of the soliton condition but the average optical output power of each optical amplifying repeater 3 is set to 3 dBm.

Figure 5:
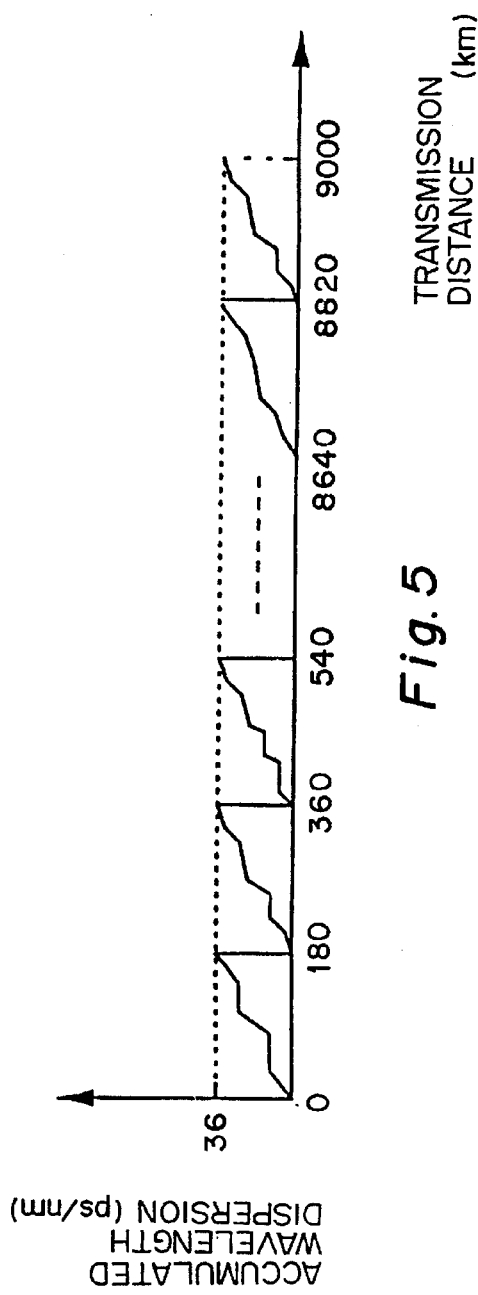
FIG. 5 illustrates a graph showing the relationship of the accumulated wavelength dispersion to the distance of transmission in Embodiment 1 of the present invention.

The dispersion media 4 are each inserted in the optical fiber 2 for each path length of 180 km. In the present invention, the dispersion media 4 for compensating for the accumulated wavelength dispersion need not always be inserted at regular intervals, but it seems that many systems adopt fixed spacing for reasons of easy fabrication. The dispersion media 4 are each formed by a 600-m long, dispersion compensating fiber (zero dispersion wavelength: 2400 nm) which has a wavelength dispersion value of −60 ps/km/nm to cancel a positive accumulated wavelength dispersion of 36 ps/nm for a 180-km long portion of the optical fiber. FIG. 5 shows the relationship of the accumulated dispersion value to the transmission distance in Embodiment 1.

The lightwave signal receiving device 5 is an optical receiver which receives a 20 Gbit/s lightwave signal and converts it into an electrical signal.

Figure 6A:
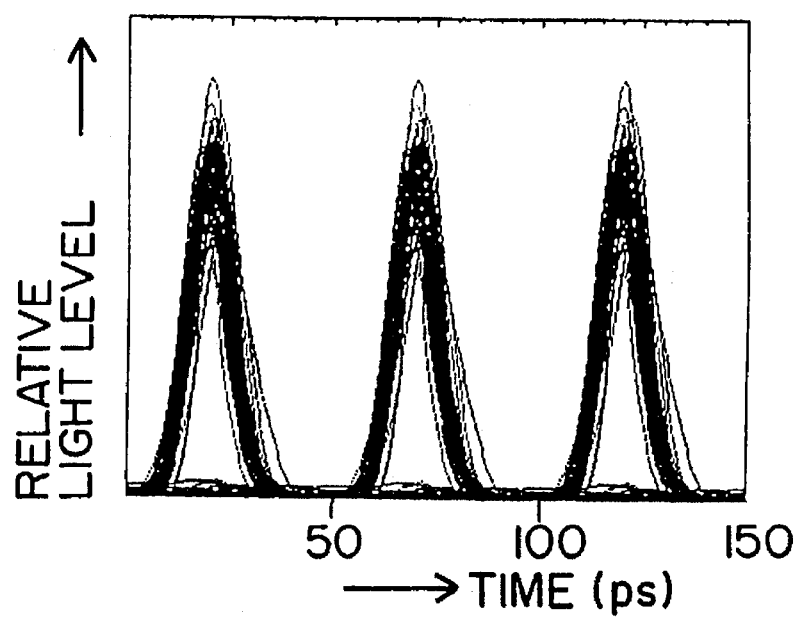
FIG. 6 illustrates a graph (a) showing the results of computer simulations on the eye diagram of an optical waveform transmitted 9000 km in Embodiment 1 of the present invention and a graph (b) showing the results of computer simulations on the eye diagram in the case where a signal of the optical waveform transmitted 9000 km in Embodiment 1 was converted to electrical signals and passed through a low-pass filter in a receiving device.
Figure 6B:
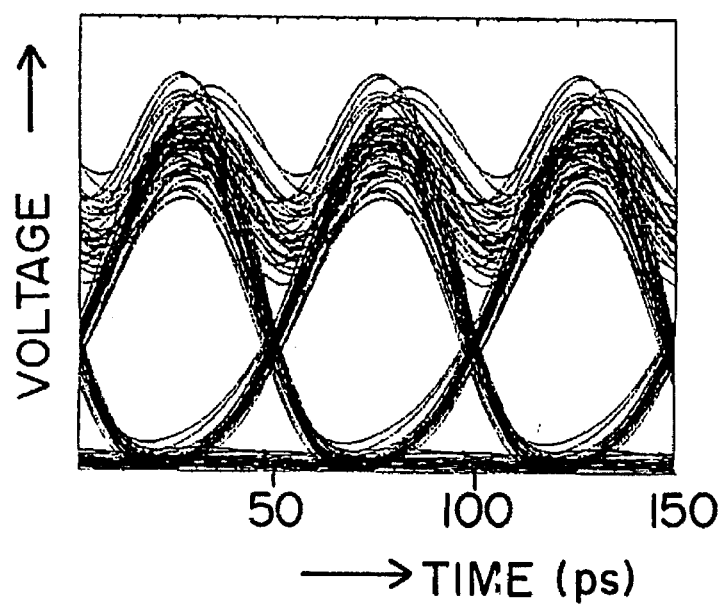

Incidentally, to demonstrate the effectiveness of this embodiment, there are shown the results of computer simulations using the system configuration of this embodiment. FIG. 6(a) is an eye diagram of waveforms of lightwave signals received after transmission of 9000 km and FIG. 6(b) an eye diagram of the received electrical signals converted from lightwave signals passed through a low-pass filter in the receiving device. The received waveforms depicted in FIG. 6(a) indicate that almost all the lightwave signals arrived at the same time (lying one on top of another on the eye diagram) ever after transmission of 9000 km; it will be seen that the timing jitter, which is a serious problem of the prior art, has been cancelled substantially completely. In this embodiment, it is possible to determine if the received signal is larger or smaller than a threshold voltage, from the eye diagram of the signals having passed through the low-pass filter in the receiving device, and the bit error rate that is calculated from this eye diagram is $1\times10^{-23}$. This bit error rate, simply calculated, corresponds to the rate at which an error arises once in hundreds of thousands of years; thus, substantially an error-free transmission characteristic could be obtained. This is an excellent transmission characteristic which far exceeds a bit error rate required in practical use, for example, $1\times10^{-12}$ or below, and even if various factors for variations in actual systems are taken into consideration, the code error rate for practical use could be obtained without difficulty.

Simulations were carried out on the transmission characteristic of the lightwave signals transmitted 9000 km, with a 1.5 km-long dispersion compensating fiber inserted so as to cancel a wavelength dispersion value of 90 ps/nm accumulated over a 450 km-long portion of the optical fiber. The other conditions are the same as mentioned above. As a result, a bit error rate of $1\times10^{-14}$ was accomplished. Incidentally, this bit error rate was further improved by increasing the optical amplifier output.

(Embodiment 2)

Figure 7:
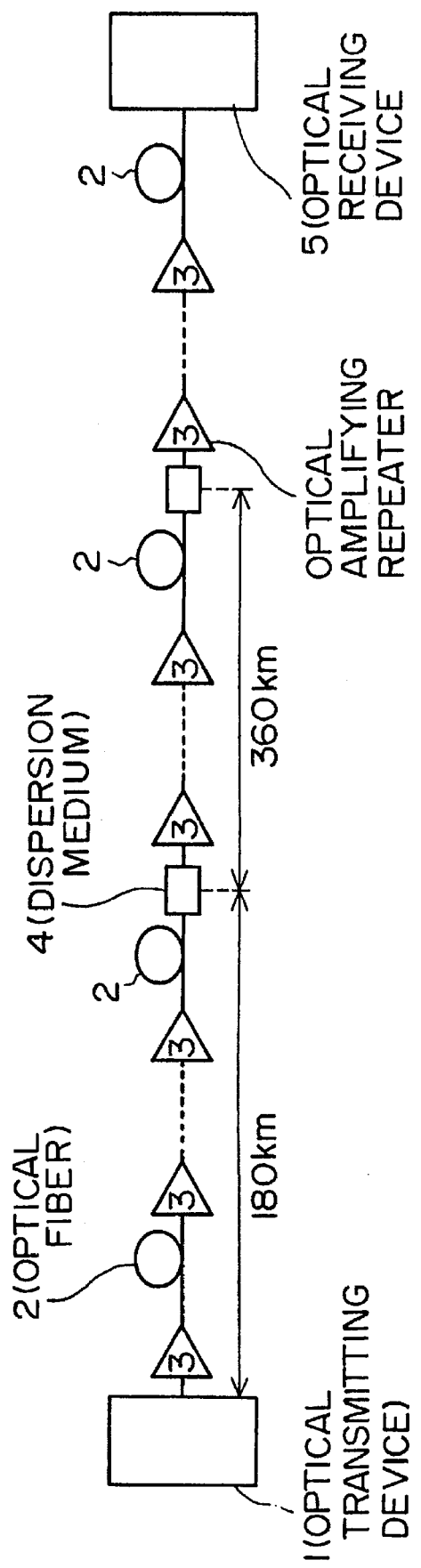
FIG. 7 illustrates a block diagram illustrating an optical amplifying-repeating transmission system of Embodiment 2 of the present invention.

FIG. 7 illustrates a second embodiment of the present invention. Reference numeral 1 denotes a 20 Gbit/s lightwave signal transmitting device, 2 an optical fiber for transmission, 3 optical amplifying repeaters, 4 dispersion media for compensating for accumulated wavelength dispersion and 5 a lightwave signal receiving device. In this embodiment, the accumulated wavelength dispersion of the optical fiber 2 every 360 km is compensated for by inserting the dispersion medium 4 in the optical fiber at the intermediate point.

Figure 8:
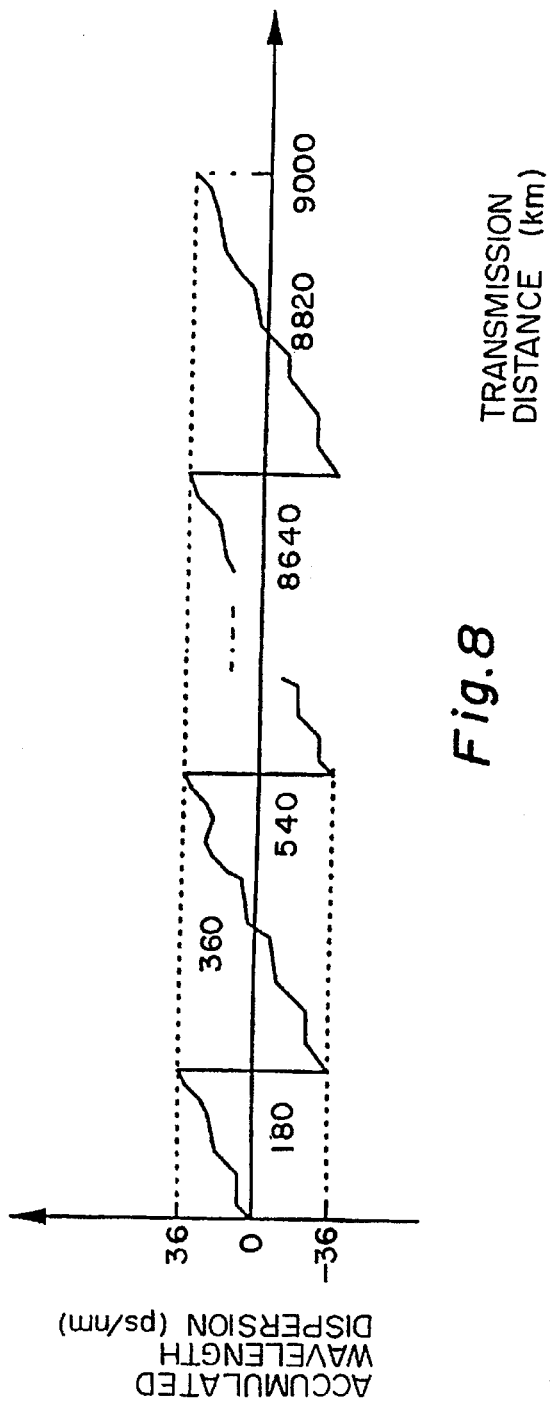
FIG. 8 illustrates a graph showing the relationship of the accumulated waveform dispersion to the distance of transmission in Embodiment 2 of the present invention.

FIG. 8 is a graph showing the relationship of the accumulated wavelength dispersion value to the distance of transmission in Embodiment 2. In Embodiment 1 the accumulated wavelength dispersion value is a positive dispersion above the vicinity of zero (anomalous dispersion), but this embodiment differs from Embodiment 1 in that there are regions where the accumulated dispersion value is negative (normal dispersion).

The optical fiber 2 is approximately 9000 km long, the average zero dispersion wavelength is 1555 nm and the average wavelength dispersion value at a signal wavelength of 1558 nm is 0.2 ps/km/nm.

As is the case with Embodiment 1, there are provided 300 optical amplifying repeaters 3 at intervals of about 30 km to compensate for losses of the optical fiber. The pulses to be sent are sech2 type return-to-zero lightwave pulses whose full width at half maximum (t) of the time waveform is 7 ps. The average optical power of the optical fiber 2 for each section between the optical amplifying repeaters is 1 dBm in terms of the soliton condition but the average optical output power of each optical amplifying repeater is set to 3 dBm. In the optical fiber 2 there is inserted one dispersion medium 4 for compensating for accumulated wavelength dispersion at a distance of 180 km from the starting point. As the dispersion medium 4, a 1.2 km-long optical fiber having a wavelength dispersion value of −60 ps/km/nm is used to cancel an accumulated wavelength dispersion value of 72 ps/nm for a 360-km long portion of the optical fiber. The other dispersion media 4 are inserted at intervals of 360 km.

Figure 9A:
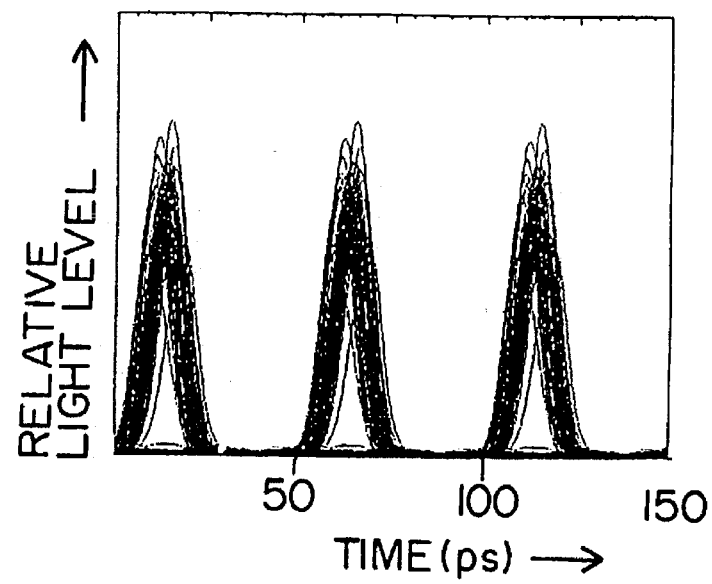
FIG. 9 illustrates graphs showing the results of computer simulations on the eye diagram of an optical waveform transmitted 9000 km in Embodiment 2 of the present invention; where a graph (a) the results of computer simulations on the eye diagram of the optical waveform transmitted 6000 km in a soliton transmission system, and a graph (b) showing the results of computer simulations on the eye diagram in the case where a signal of the optical waveform transmitted 9000 km in Embodiment 2 of the present invention was converted to electrical signals and passed through a low-pass filter in a receiving device.
Figure 9B:
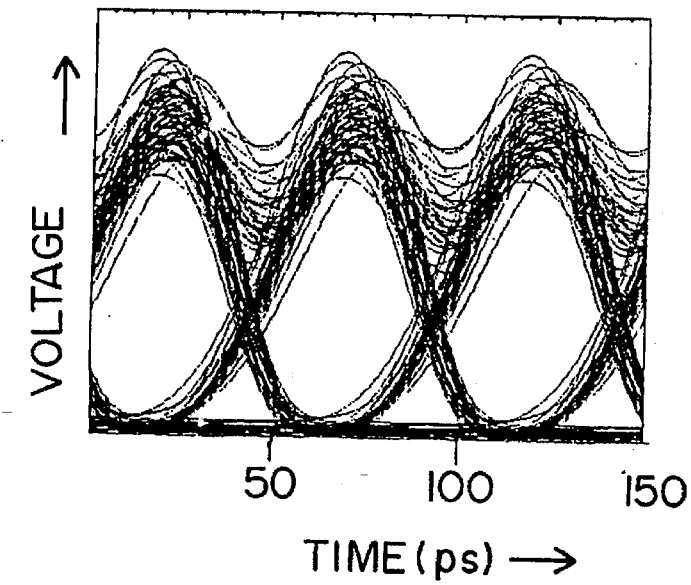

FIGS. 9(a) and (b) show received waveforms obtained by computer simulations carried on the configuration of this embodiment. From a calculation based on the received waveforms, it will be seen that a code error rate of $1\times10^{-20}$ can be attained after 9000-km transmission.

While in this embodiment the accumulated wavelength dispersion in the optical fiber for each path of 360 km is compensated for by inserting the dispersion medium 4 in the optical fiber at the intermediate point thereof, the dispersion medium 4 need not always be provided at such an intermediate point of the optical fiber but may be disposed at an arbitrary place in a predetermined section.

(Embodiment 3)

Figure 10:
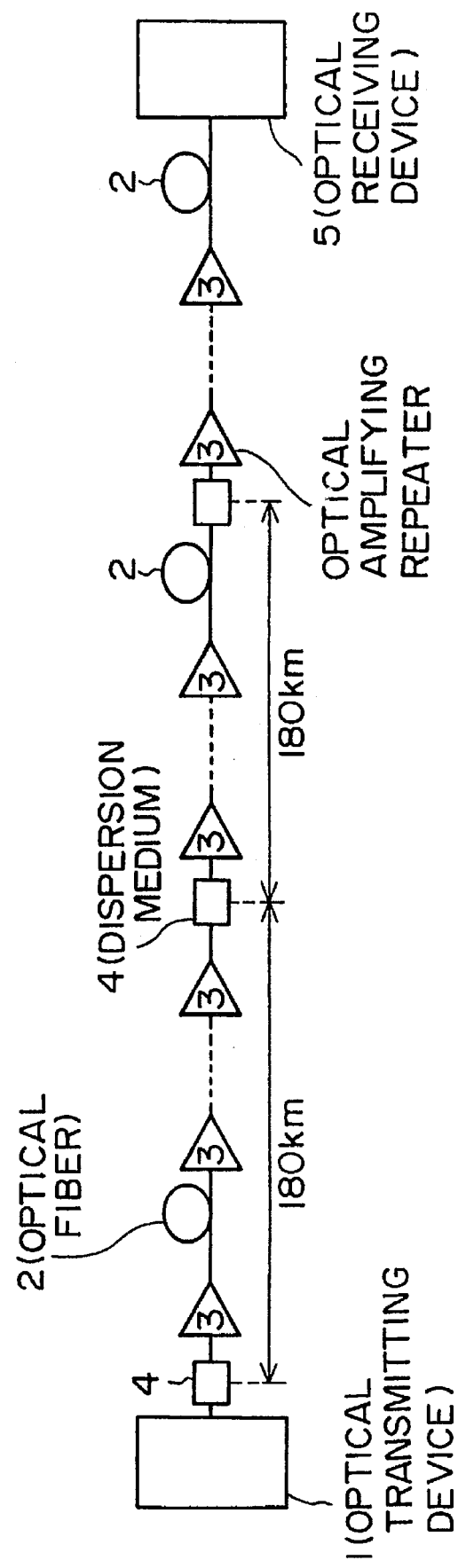
FIG. 10 illustrates a block diagram illustrating an optical amplifying-repeating transmission system of Embodiment 3 of the present invention.
Figure 11:
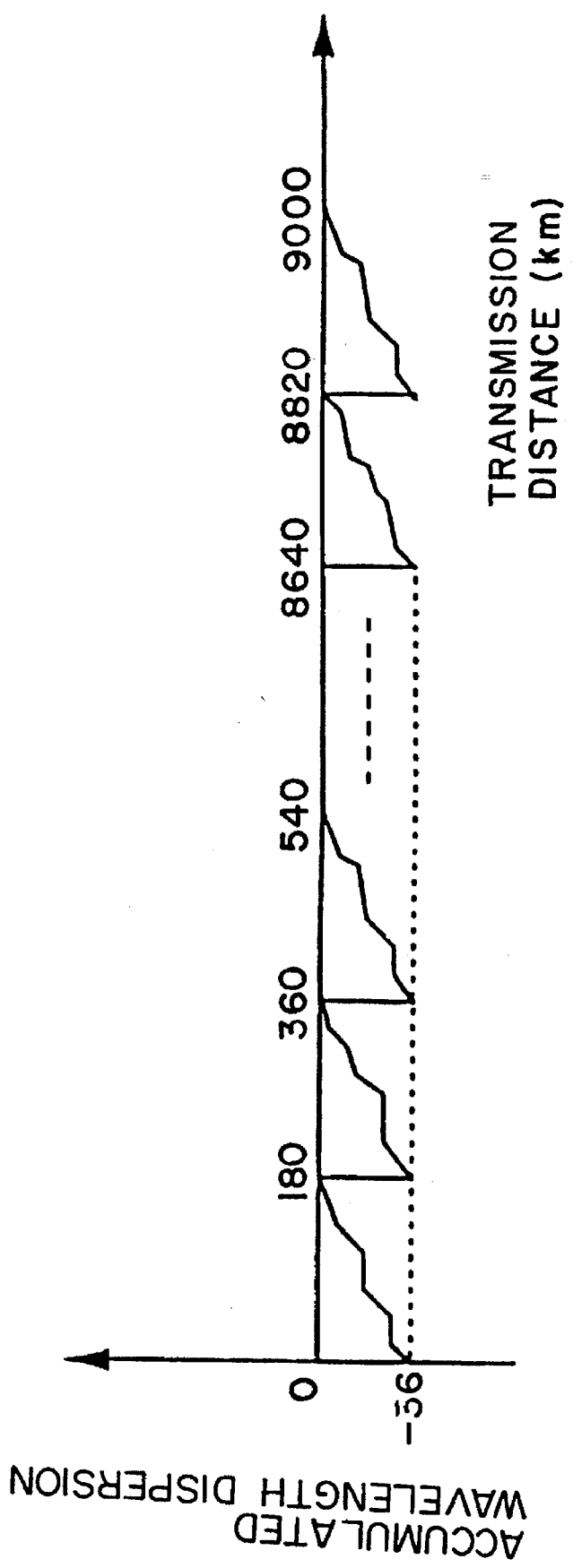
FIG. 11 illustrates a graph showing the relationship of the accumulated wavelength dispersion to the distance of transmission in Embodiment 3 of the present invention.

FIG. 10 illustrates a third embodiment of the present invention. Reference numeral 1 denotes a 20 Gbit/s lightwave signal transmitting device, 2 an optical fiber for transmission use, 3 optical amplifying repeaters, 4 dispersion media for accumulated wavelength dispersion compensating use and 5 a lightwave signal receiving device. In this embodiment, the lightwave signal transmitting device 1 includes the dispersion compensating medium 4 having a dispersion value of −36 ps/nm and is set so that the accumulated dispersion by the optical fiber for transmission use starts at a value other than zero. This embodiment is identical in construction with Embodiment 1 except the above. Even if the output waveform of the optical transmitting device is modified by passing it through the dispersion medium prior to transmission, the lightwave signal can stably be transmitted. FIG. 11 shows the relationship of the accumulated wavelength dispersion value to the distance of transmission in Embodiment 3.

Figure 12A:
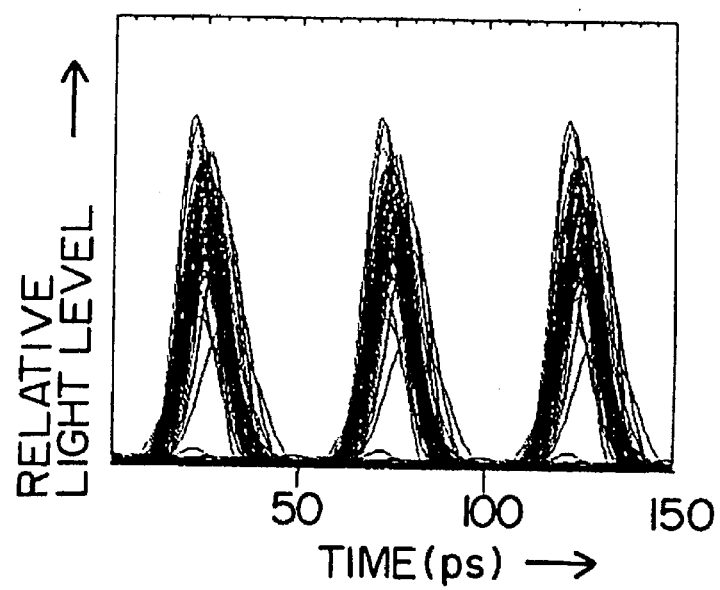
FIG. 12 illustrates a graph (a) showing the results of computer simulations on the eye diagram of optical waveform transmitted 9000 km in Embodiment 3 of the present invention and a graph (b) showing the results of computer simulations on the eye diagram in the case where a signal of the optical waveform transmitted in Embodiment 3 of the present invention was converted to electrical signals and passed through a low-pass filter in a receiving device.
Figure 12B:
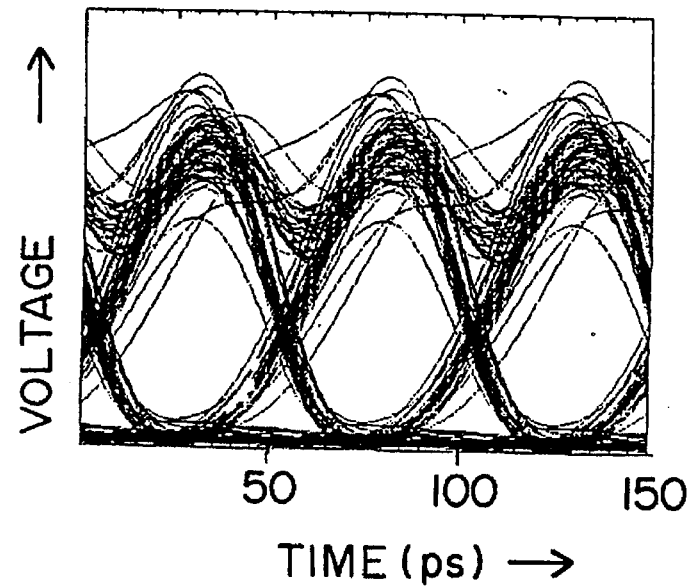

FIGS. 12(a) and (b) show received waveforms obtained by computer simulations carried out on this embodiment. It will be seen from a calculation based on the received waveforms that a bit error rate of $1\times10^{-16}$ can be accomplished after 9000 km transmission.

(Embodiment 4)

Figure 13:
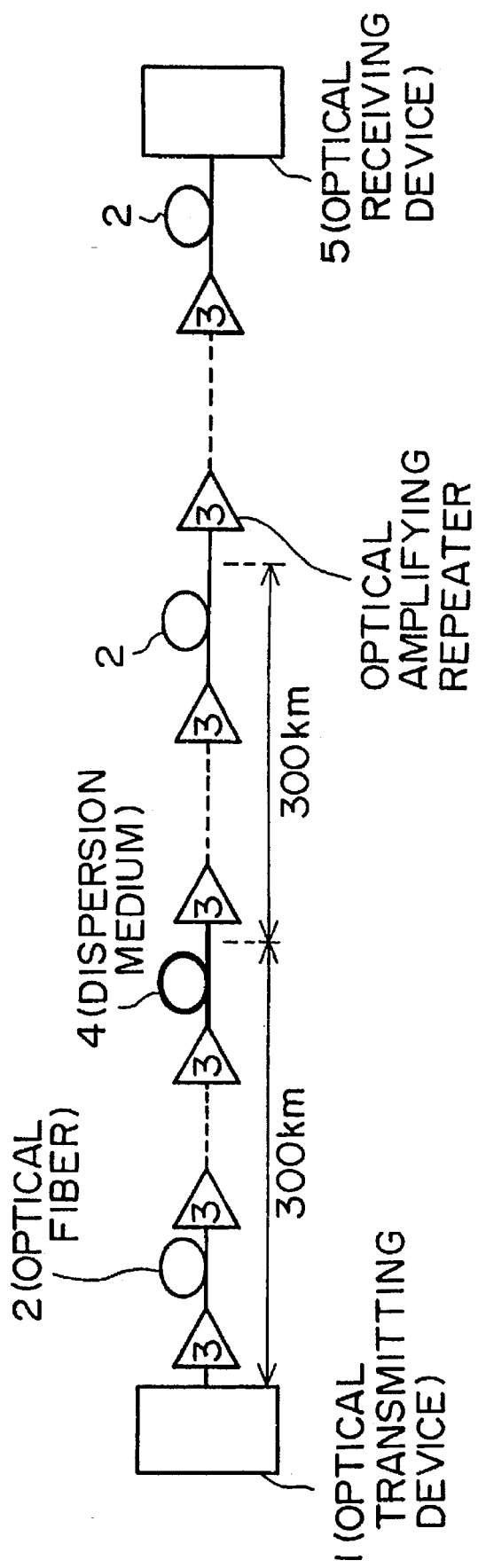
FIG. 13 illustrates a block diagram illustrating an optical amplifying-repeating transmission system of Embodiment 4 of the present invention.

FIG. 13 illustrates a fourth embodiment of the present invention. Reference numeral 1 denotes a 20 Gbit/s lightwave transmitting device, 3 optical amplifying repeaters and 5 lightwave receiving device. In this embodiment, the lightwave pulses which are transmitted from the 20 Gbit/s lightwave transmitting device 1 are sech2 type return-to-zero lightwave pulses whose full width at half maximum (t) of the time waveform is 11 pa. The optical fiber 2 for transmission use is about 9000 km long, the average zero dispersion wavelength is 1555 nm, shorter than a lightwave signal waveform of 1558 nm, and the average waveform dispersion value D at the signal wavelength is 0.2 ps/km/nm. To compensate for losses by the optical fiber, there are provided 300 optical amplifying repeaters at intervals of about 30 km. Reference numeral 4 denotes dispersion media each of which is a 30-km long accumulated wavelength compensating optical fiber which has a zero dispersion of about 1580 nm and an average wavelength dispersion value of −1.8 ps/km/nm at the wavelength of the lightwave signal; the dispersion media are inserted for each ten repeater sections to compensate for am accumulated wavelength dispersion value of 54 ps/nm by the optical fiber over nine repeater sections.

In this embodiment, the optical amplifying repeaters mostly have no optical band-pass filter built-in, but only the optical amplifying repeaters 3 disposed after the dispersion media 4 each contain an optical band-pass filter of a 3 nm full width at half maximum.

Figure 14A:
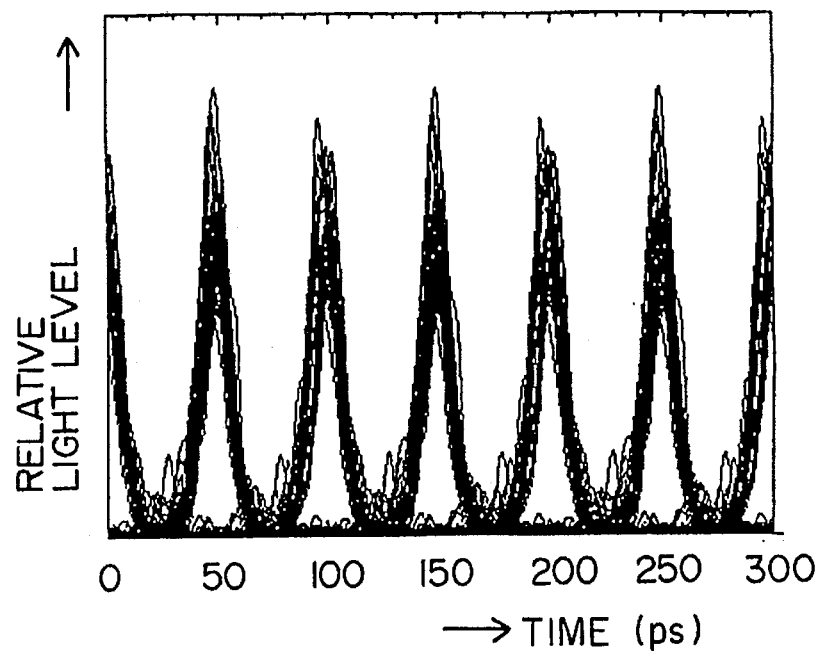
FIG. 14 illustrates a graph (a) showing the results of computer simulations on the eye diagram of an optical waveform transmitted 9000 km in Embodiment 4 of the present invention; and a graph (b) showing the results of computer simulations on the eye diagram in the where a signal of the optical waveform transmitted 9000 km in Embodiment 1 of the present invention was converted to electrical signals and passed through a low-pass filter in a receiving device.
Figure 14B:
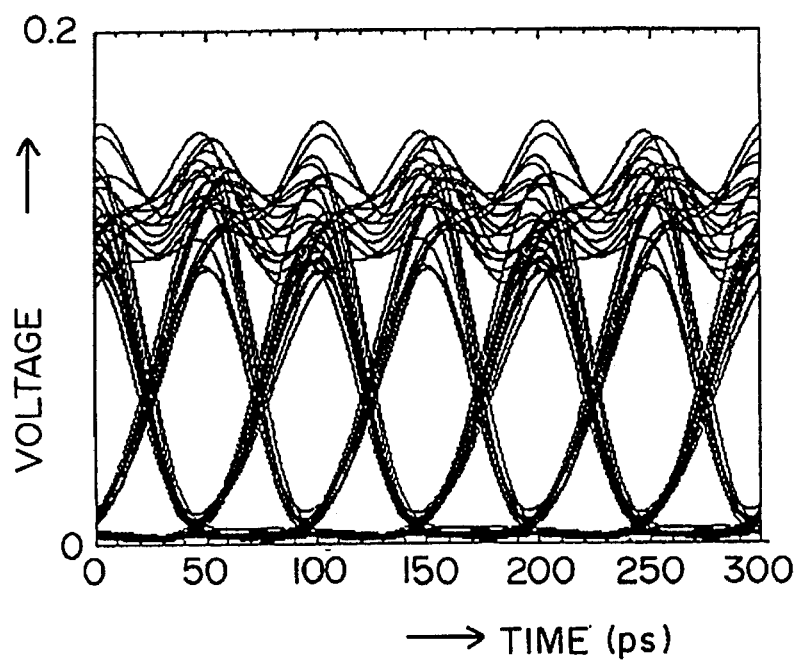

FIGS. 14(a) and (b) show received waveforms obtained by computer simulations carried out on this embodiments. It will be seen from a calculation based on the received waveforms that a bit error of $2\times10^{-13}$ is accomplished after 9000 km transmission.

While this embodiment uses a dispersion compensating optical fiber which has a length of 30 km corresponding to one repeater section, it is also possible to use a dispersion compensating optical fiber of a length corresponding to, for example, one and a half or two repeater sections.

(Embodiment 5)

Figure 15:
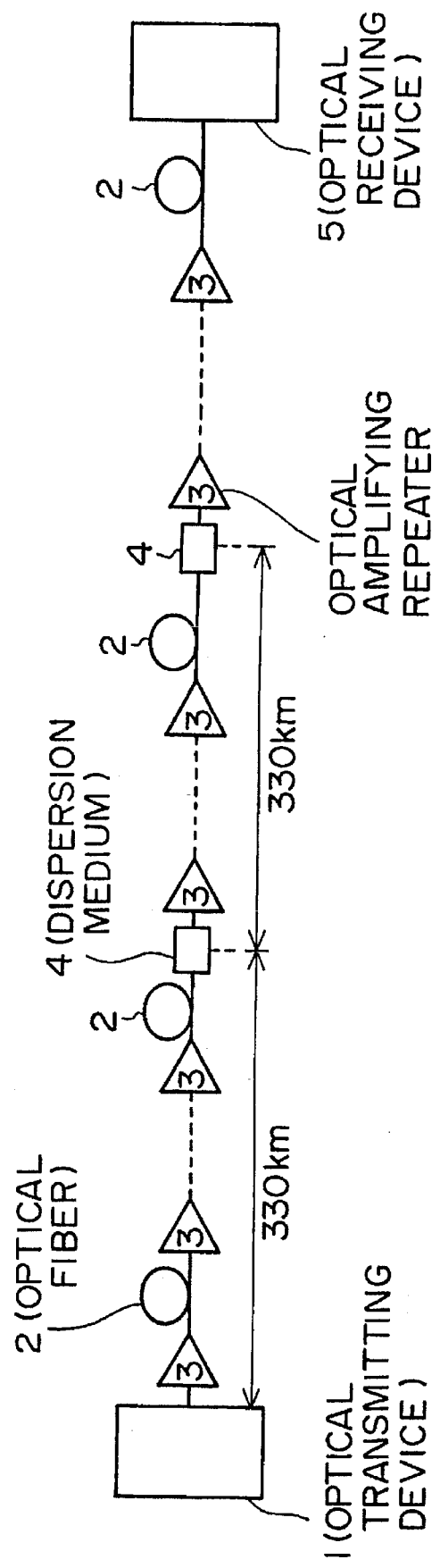
FIG. 15 illustrates a block diagram illustrating an optical amplifying-repeating transmission system of Embodiment 5 of the present invention.

FIG. 15 illustrates a fifth embodiment of the present invention. Reference numeral 1 denotes a 20 Gbit/s lightwave transmitting device, 3 optical amplifying repeaters and 5 a lightwave receiving device. In this embodiment, the lightwave pulses which are transmitted from the 20 Gbit/s lightwave transmitting device 1 are sech2 type return-to-zero lightwave pulses which is 11 ps in the full width at half maximum of the time waveform. The optical fiber 2 is about 9000 km long, the average dispersion wavelength is 1555 nm, shorter than a 1558-nm wavelength of the lightwave signal, and the average wavelength dispersion value D at the signal wavelength is 0.22 ps/km/nm. To compensate for losses of the optical fiber, there are provided, at intervals of about 33 km, 273 optical amplifying repeaters 3 whose optical output is 1 dBm. Reference numeral 4 denotes dispersion media each of which is a 800-m long accumulated wavelength compensating optical fiber which has an average wavelength dispersion value of −65 ps/nm at the wavelength of the lightwave signal; the dispersion media are inserted every ten repeater sections (every 330 km) to compensate for 90% of an accumulated wavelength dispersion value of around 72 psm/nm of the optical fiber over the ten repeater sections.

Figure 16:
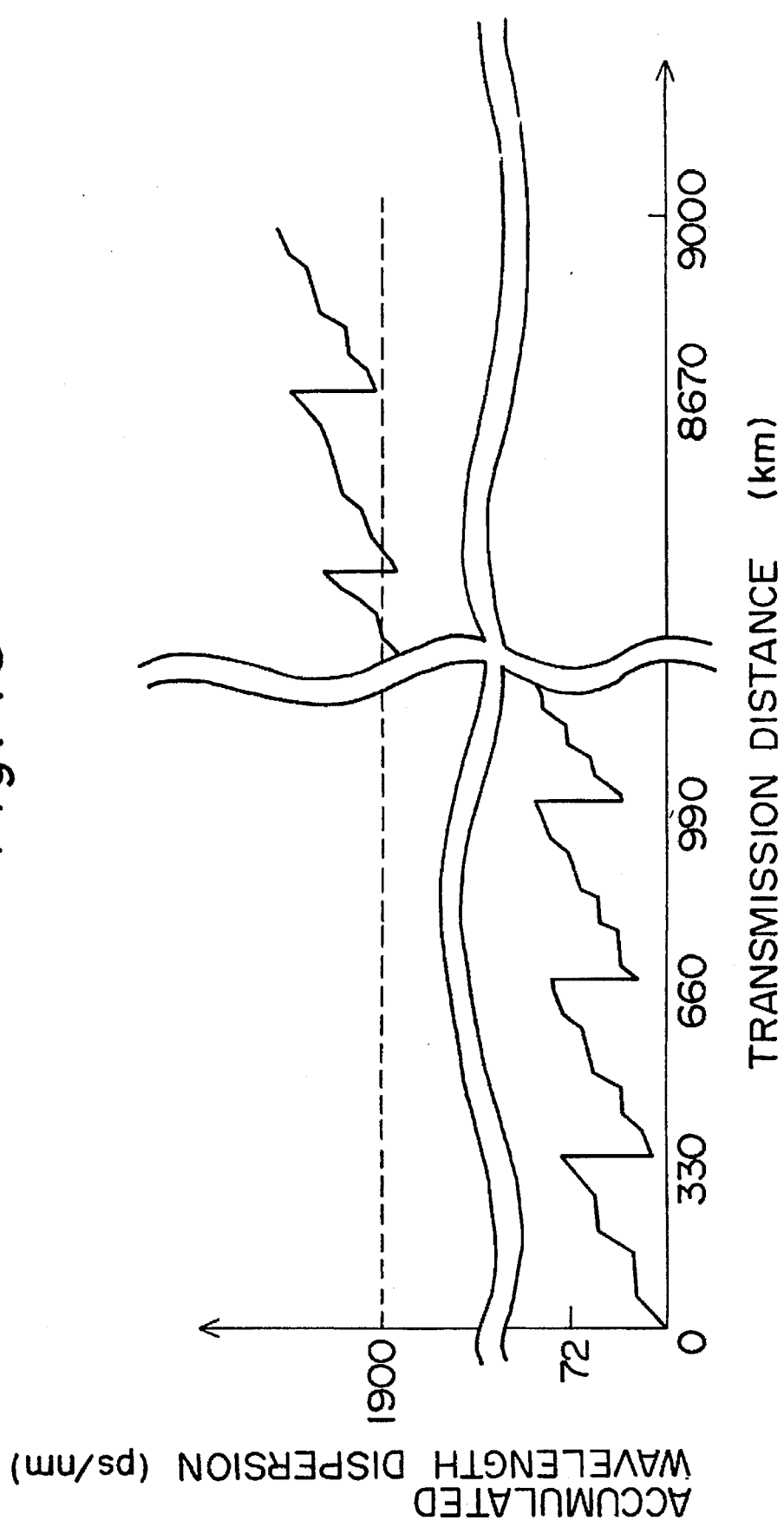
FIG. 16 illustrates a graph showing the relationship of the accumulated wavelength dispersion to the distance of transmission in Embodiment 5 of the present invention.
Figure 17:
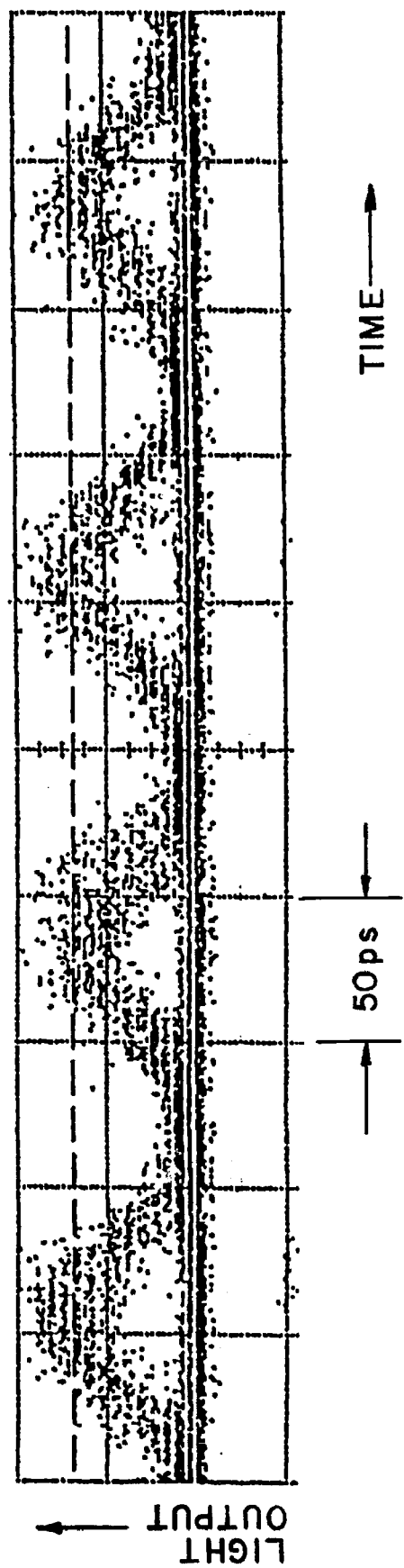
FIG. 17 illustrates an eye diagram of optical waveforms transmitted 9000 km in the optical amplifying -repeating transmission system of Embodiment 5 of the present invention.
Figure 18A:
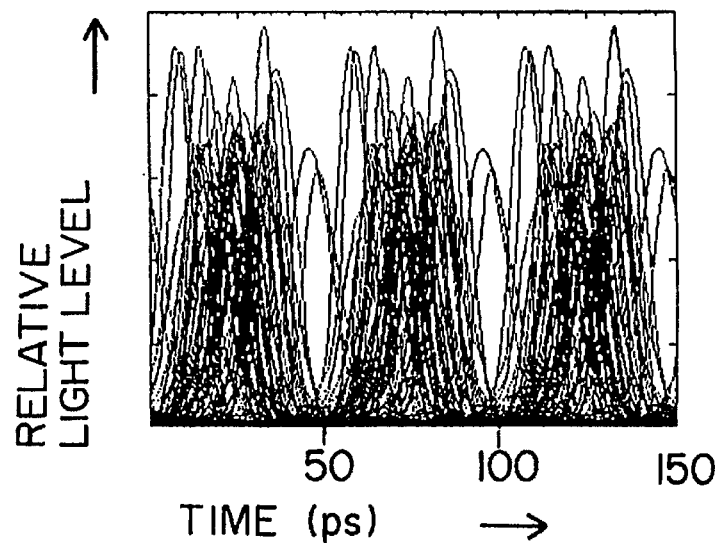
FIG. 18 illustrates a graph (a) sowing the results of computer simulations on the eye diagram of an optical waveform of a 20 Gbit/s soliton lightwave signal transmitted 6000 km in a conventional 20 Gbit/s optical soliton transmission system; and a graph (b) showing the results of computer simulations in the case where the 20 Gbit/s soliton lightwave signal transmitted 6000 km was converted to electrical signals and passed through a low-pass filter in a receiving device.
Figure 18B:
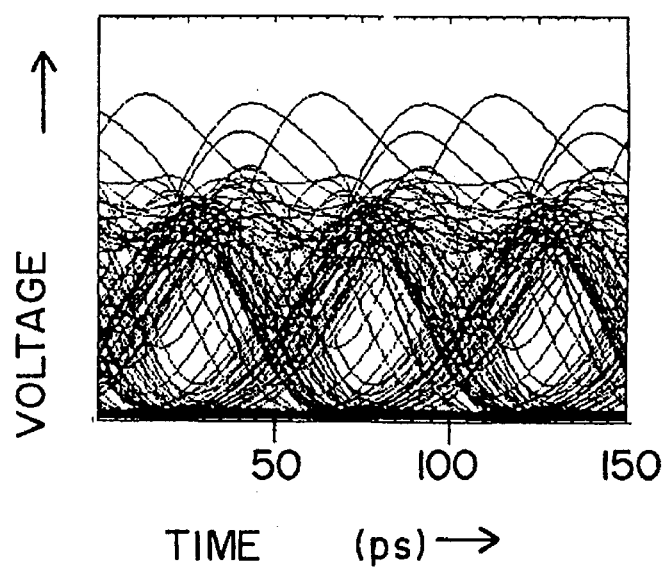

To confirm the effect of this embodiment, transmission experiments were conducted with an optical loop-transmission line constructed using 30 optical amplifying repeaters, an optical fiber about 1000 km long and dispersion compensating optical fibers inserted for every ten repeater sections. FIG. 16 shows a transmission distance-accumulated wavelength dispersion characteristic of the system of this embodiment. FIG. 17 shows received waveforms obtained after 9000-km transmission (after nine rounds). A bit error rate of lower than $1\times10^{-12}$ was accomplished after 9000-km transmission.

In this embodiment, an optical band-pass filter having a 5-nm bandwidth is disposed for every second optical amplifying repeaters.

This embodiment has been described to compensate for 90% of the accumulated wavelength dispersion, but as is evident from this embodiment, it is possible to use not only the dispersion compensating medium which compensates for 100% of the accumulated wavelength dispersion but also dispersion compensating medium which compensated for less than 100% of the accumulated wavelength dispersion (an amount of dispersion for suppressing the timing jitter to maintain a certain bit error rate).

In Embodiments 1, 2, 3 and 5, the pulses for transmission have been $sech^2$ type lightwave pulses but other RZ pulses may also be used.

Embodiment 1 has been described to reduce the accumulated wavelength dispersion to zero exactly every 180 km, but even if the dispersion value by the optical fiber for transmission use varies about plus or minus 50% due to fabrication, substantially the same transmission characteristic could be obtained by compensating with the dispersion medium of a −36 ps/nm. That is, in Embodiments 1, 2, 3, 4 and 5, the dispersion compensating value needs not to be a value which completely compensates for the accumulated dispersion value in each section, but it may also vary about plus or minus 50% due to fabrication.

While in Embodiments 1, 2, 3 and 5 an optical fiber having a zero dispersion of 2.4 μm is used as the dispersion medium 4, it is possible to obtain a dispersion medium having a wavelength dispersion value of about −40 ps/km/nm to −100 ps/km/nm at the wavelength of the lightwave signal by using an optical fiber having a zero dispersion wavelength of 2 to 3 μm.

In Embodiment 1, a wavelength dispersion of 36 ps/nm remains in the last repeater section, but the same characteristic can be obtained even by equalizing it to zero at the receiving end. Accordingly, in Embodiments 1, 2, 3, 4 and 5, normal or anomalous dispersion equalization may be done at the receiving end. Moreover, the interval of inserting the dispersion medium 4 is not limited specifically to 180 km in Embodiments 1 and 3 and 360 km in Embodiment 2, but in view of the purpose of generating a stable soliton lightwave signal, the interval needs to be long to some extent; the interval longer than the soliton period (96 km in the aforementioned embodiments) is particularly effective in achieving the purpose. Since an increase in the interval of insertion causes an increase in the non-soliton component, however, it is necessary to generate a stable soliton lightwave signal by setting the optical amplifying repeater output to a large value as required.

Although Embodiments 1, 2, 3, 4 and 5 have been described to use a single-wavelength laser and an electro-absorption optical modulator as a short pulse light source, a mode-locked laser, a gain-switched laser or any other soliton light sources may also be used. Furthermore, the optical transmitting device 1 is constructed to directly transmit the 20 Gbit/s lightwave signal, but the 20 Gbit/s lightwave signal may also be generated by optical time division 2-, 4- or 8-multiplexing.

In Embodiments 1, 2 and 3 an optical band-pass filter of a 6-nm bandwidth is included in each optical amplifying repeater for the purpose of cancelling the non-soliton component, but the bandwidth and shape of the optical band-pass filter and the interval of its insertion are not limited to the values specified in those embodiments and it can be formed as in Embodiment 4 or 5; that is, first-order band-pass filters, second-order Butterworth type optical band pass filters and second-order Bessel type optical band-pass filters, which have different bandwidths, may be disposed every several optical repeaters. Furthermore, the optical band-pass filters may also be replaced with or used in combination with elements which have the same effect as the optical band-pass filters used in the embodiments, such as saturable absorbers. Incidentally, when the influence of the non-soliton component is negligible, the optical band-pass filters can be omitted.

While Embodiments 1, 2, 3, 4 and 5 have been described as being applied to the 20 Gbit/s optical communication system, the present invention permits realization of long-distance optical communication at higher transmission rate above several tens of gigabits per second.

In Embodiments 1, 2, 3 and 4, the optical output from the optical amplifying repeater is set to 3 dBm, but if it is set to a value larger than the optical output value which balances the pulse width compression effect by the nonlinear optical effect of the optical fiber 2 and the pulse width expansion effect by its wavelength dispersion which are produced on the lightwave signal being transmitted when the dispersion medium 4 is not used, this is equivalent to setting the lightwave signal power in the transmission system to a large value, by which the amount of optical noise can be reduced relative to the optical output value, decreasing the timing jitter.

As described above in detail, the prior art methods had difficulty in long-distance transmission of ultrafast lightwave signals owing to the Gordon-Haus timing jitter, but the present invention makes it possible to construct an ultra-large capacitance, long-distance optical transmission system free from the limitations by the timing jitter. With the prior art, it is impossible to construct a long-distance optical repeating transmission system in the transpacific transmission system class with a transmission rate above 20 Gbit/s, but the present invention permits the realization of error-free transpacific transmission system, and hence is remarkably effective in the implementation of an ultra-large capacity, long-distance submarine cable or the like.

What we claim is:

1. An optical amplifying-repeating transmission system, comprising: an optical fiber for transmitting a lightwave signal with digital information added to return-to-zero lightwave pulses and a plurality of optical amplifying repeaters disposed on said optical fiber, a mean value of wavelengths at which wavelength dispersion of said optical fiber is zero being smaller than a wavelength of said lightwave signal which is transmitted over said system;

an accumulated wavelength dispersion value of said optical fiber increasing with the distance of transmission considered macroscopically:

said optical fiber for transmitting the lightwave signal being divided into a plurality of sections; and in accordance with an accumulated wavelength dispersion value of said optical fiber in each section except the last one, a wavelength dispersion medium, locally changing the wavelength dispersion effectively to cancel the accumulated wavelength dispersion in the section concerned at the wavelength of said lightwave signal, being disposed in said section.

2. An optical amplifying-repeating transmission system, comprising: an optical transmitting device for transmitting a lightwave signal with digital information added to return-to-zero lightwave pulses, an optical receiving device for receiving the transmitted lightwave signal, an optical fiber for transmitting of the lightwave signal interconnecting said transmitting device and said receiving device, and a plurality of optical amplifying repeaters disposed spaced on said optical fiber, a mean value of wavelengths at which the wavelength dispersion of said optical fiber is zero being smaller that the wavelength of said lightwave signal which is transmitted over said system;

an accumulated wavelength dispersion value of said optical fiber increasing with the distance of transmission considered macroscopically;

said optical fiber for transmitting of the lightwave signal being divided into a plurality of sections;

in accordance with an accumulated wavelength dispersion value of said optical fiber in each section except the last one, a wavelength dispersion medium, locally changing the wavelength dispersion effective to cancel the accumulated wavelength dispersion in the section concerned at the wavelength of said lightwave signal, being disposed in said section.

3. An optical amplifying-repeating transmission system according to claim 2, in which said optical transmitting device contains said dispersion medium and the accumulated dispersion of said optical fiber for transmission starts at a value other than zero.

4. An optical amplifying-repeating transmission system, comprising: an optical fiber for transmitting a lightwave signal with digital information added to return to zero lightwave pulses and a plurality of optical amplifying repeaters disposed spaced on said optical fiber, a mean value of wavelengths at which the wavelength dispersion of said optical fiber is zero being smaller than the wavelength of said lightwave signal which is transmitted over said system;

an accumulated wavelength dispersion value of said optical fiber increasing with the distance of transmission, from a macroscopic viewpoint;

said optical fiber for transmitting the lightwave signal being divided into a plurality of sections;

in accordance with the accumulated wavelength dispersion value of said optical fiber in each section except the last one, a wavelength dispersion medium, locally changing the wavelength dispersion in the section concerned at the wavelength of said lightwave signal, being disposed in said section;

optical outputs of said plurality of optical amplifying repeaters being set to a value larger than an optical output value at which a pulse width compression effect by the nonlinear optical effect of said optical fiber balances with the pulse width expansion effect by its wavelength dispersion produced when said dispersion medium is not used.

5. An optical amplifying-repeating transmission system, comprising: an optical fiber for transmitting a lightwave signal with digital information added to return-to-zero lightwave pulses and a plurality of optical amplifying repeaters disposed on said optical fiber, a mean value of wavelengths at which the wavelength dispersion of said optical fiber is zero being smaller than the wavelength of said lightwave signal which is transmitted over said system;

an accumulated wavelength dispersion value of said optical fiber increasing with the distance of transmission considered macroscopically;

said optical fiber for transmitting the lightwave signal being divided into a plurality of sections;

in accordance with the accumulated wavelength dispersion value of said optical fiber in each section except the last one, a wavelength dispersion medium, locally changing the wavelength dispersion effectively to cancel the accumulated wavelength dispersion in the section concerned at the wavelength of said lightwave signal, being disposed in said section;

said lightwave signal having a wavelength of about 1.5 µm, said optical fiber for transmission being a dispersion-shifting optical fiber whose average wavelength dispersion value is anomalous dispersion, and said wavelength dispersion medium being an optical fiber having a zero wavelength dispersion included in a 2 to 3 µm wavelength band and whose wavelength dispersion value at the wavelength of said lightwave signal is a normal dispersion value.

6. An optical amplifying-repeating transmission system according to claim 1, 2, 4 or 5, in which at least one optical band limited element is included in each of said sections of said optical fiber.

* * * * *